(12) United States Patent
Baker et al.

(10) Patent No.: US 10,461,925 B2
(45) Date of Patent: Oct. 29, 2019

(54) HARDWARE MASKED SUBSTITUTION BOX FOR THE DATA ENCRYPTION STANDARD

(71) Applicant: Cryptography Research, Inc., Sunnyvale, CA (US)

(72) Inventors: Matthew Pond Baker, San Francisco, CA (US); Elena Trichina, Aix-en-Provence (FR); Jean-Michel Cioranesco, Paris (FR); Michael Hutter, Walnut Creek, CA (US)

(73) Assignee: Cryptography Research, Inc., Sunnyvale, CA (US)

( * ) Notice: Subject to any disclaimer, the term of this patent is extended or adjusted under 35 U.S.C. 154(b) by 198 days.

(21) Appl. No.: 15/673,284

(22) Filed: Aug. 9, 2017

(65) Prior Publication Data

US 2018/0062830 A1    Mar. 1, 2018

Related U.S. Application Data

(60) Provisional application No. 62/382,655, filed on Sep. 1, 2016.

(51) Int. Cl.
| | |
|---|---|
| *H04L 9/06* | (2006.01) |
| *G06F 21/60* | (2013.01) |
| *H04L 9/00* | (2006.01) |
| *G06F 21/55* | (2013.01) |
| *G06F 21/75* | (2013.01) |

(52) U.S. Cl.
CPC .......... *H04L 9/0631* (2013.01); *G06F 21/556* (2013.01); *G06F 21/602* (2013.01); *G06F 21/755* (2017.08); *H04L 9/003* (2013.01); *H04L 9/0618* (2013.01); *H04L 2209/12* (2013.01)

(58) Field of Classification Search
CPC ...................................................... H04L 9/631
USPC .......................................................... 380/28
See application file for complete search history.

(56) References Cited

U.S. PATENT DOCUMENTS

| | | |
|---|---|---|
| 7,848,514 B2 | 12/2010 | Gebotys |
| 8,705,731 B2 | 4/2014 | Trichina |
| 2011/0228928 A1* | 9/2011 | Trichina .................. H04L 9/003 380/28 |
| 2016/0127123 A1 | 5/2016 | Johnson |

OTHER PUBLICATIONS

EP Extended European Search Report dated Nov. 9, 2017 re: EP Appln. No. 17185676.5. 7 Pages.

(Continued)

*Primary Examiner* — Jacob Lipman
(74) *Attorney, Agent, or Firm* — Lowenstein Sandler LLP

(57) ABSTRACT

An integrated circuit may implement a masked substitution box that includes a counter that generates counter values. An input mask component may generate unmasked input values based on a combination of respective counter values and an input mask value. Furthermore, a substitution function component may receive the unmasked input values and may generate output values based on respective unmasked input values and a substitution function. An output mask component may generate masked output values based on a combination of respective output values and an output mask value. The masked output values may be stored at memory elements.

5 Claims, 11 Drawing Sheets

(56) References Cited

OTHER PUBLICATIONS

Sasdrich, Pascal et al., "Achieving Side-Channel Protection With Dynamic Logic Reconfiguration on Modern FPGAs", International Association for Cryptologic Research, vol. 20150306:132220, Mar. 5, 2015, pp. 1-7, 7 Pages.

Bertoni, Guido et al., "Power-efficient ASIC synthesis of Cryptographic Sboxes" In Proceedings of the 14th ACM Great Lakes Symposium on VLSI, Apr. 2004, pp. 277-281. 5 pages.

* cited by examiner

HARDWARE MASKED SUBSTITUTION BOX FOR THE DATA ENCRYPTION STANDARD

RELATED APPLICATION

This application claims the benefit under 35 U.S.C. § 119(e) of U.S. Provisional Application 62/382,655 filed on Sep. 1, 2016, which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
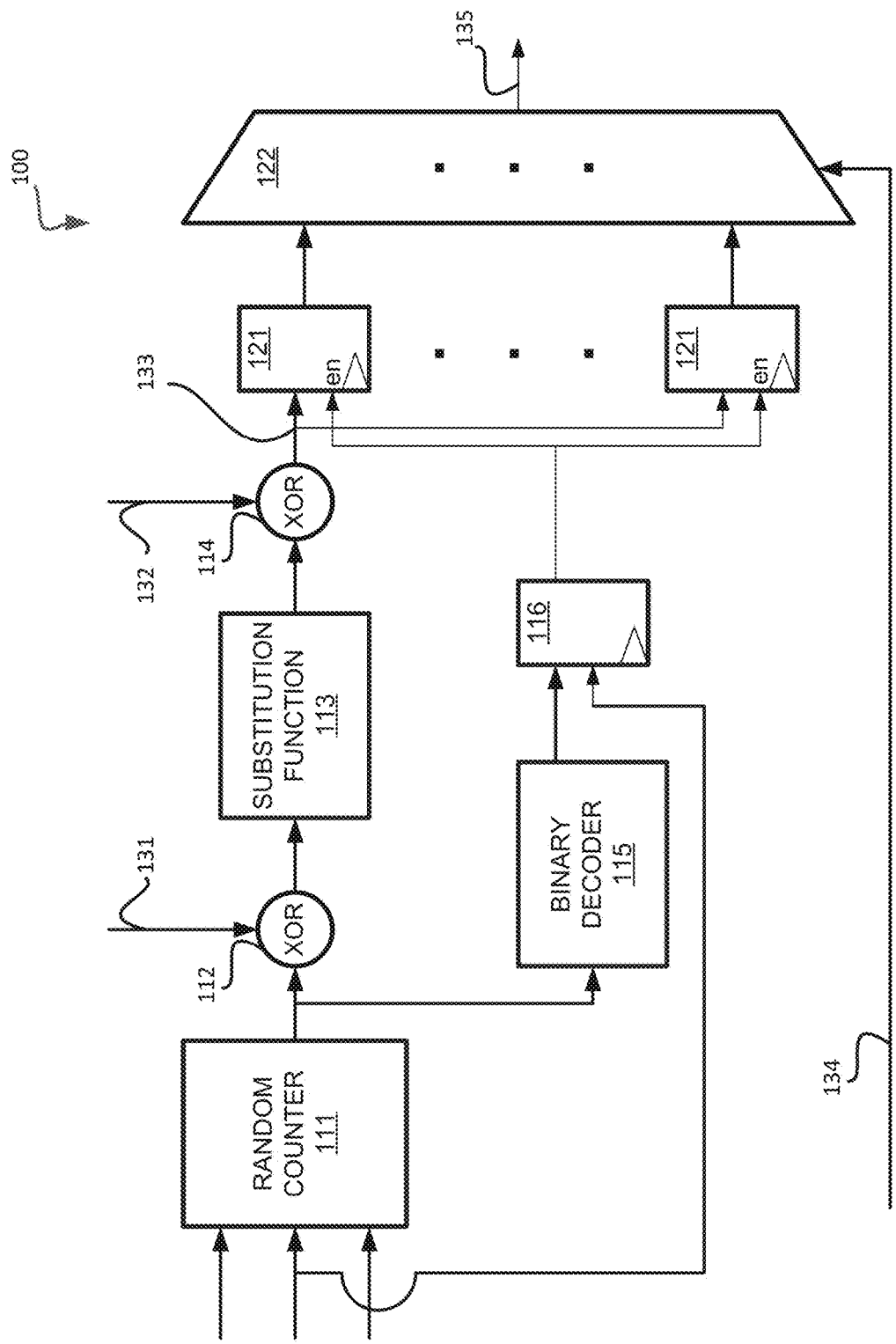
FIG. 1 illustrates an example architecture to implement a masked substitution box in accordance with some embodiments.

Aspects of the present disclosure are directed to implementations of a hardware masked substitution box (S-box). In general, a substitution box may receive an input and may provide an output that corresponds to the received input. For example, the substitution box may translate or map each input value to another output value. When the substitution box receives an input value, a corresponding output value is transmitted by the substitution box. As a result, the substitution box may provide the output value as a substitute for the received input value.

The substitution box may be implemented in an integrated circuit and may be used during the performance of a cryptographic operation. The performance of the cryptographic operation may result in the susceptibility of the integrated circuit to a side channel attack where an attacker of the integrated circuit may obtain secret information as the cryptographic operation is performed. An example of a side channel attack includes, but is not limited to, Differential Power Analysis (DPA) where the attacker who seeks to obtain a secret key or other such secret information used in the cryptographic operation may study the differences in power consumption of the integrated circuit that includes the substitution box as the cryptographic operation is performed. Such an attacker may be an unauthorized entity that may obtain information of the cryptographic operation by analyzing power consumption measurements of the integrated circuit that includes the substitution box over a period of time. Accordingly, when the cryptographic operation is performed, the attacker may be able to retrieve secret information (e.g., a secret key) that is used during the cryptographic operation.

Masking may be used to obfuscate or hide an input value to the substitution box that is used during the cryptographic operation with random data and then the cryptographic operation may be performed with the masked input value. Such masking may render the intermediate states or values of the cryptographic operation indistinguishable from random data when an attacker of the integrated circuit observes power consumption of the integrated circuit when performing the cryptographic operation. As an example, the substitution box of the integrated circuit may receive the masked input value and the mask value (e.g., the random value that is combined with the input value to generate the masked input value) and may translate or map the masked input value to a masked output value. Such a combination of the masked input value and the mask value used by the substitution box may reduce the susceptibility of the integrated circuit that includes the masked substitution box to a side channel attack.

Aspects of the present disclosure address the above and other deficiencies by implementing a hardware masked substitution box that reduces the susceptibility of the masked substitution box to a side channel attack. An architecture of the masked substitution box may be a table-based masked substitution box. For example, a hardware implementation of the masked substitution box may independently operate (e.g., in time and in space) on the masked input value and the mask value so that the side channel leakage (e.g., observable power consumption correlating the inputs and/or outputs) may be minimized as the masked input value and the mask value are not combined in the masked substitution box. In some embodiments, the masked substitution box may first operate on the masked value to generate a substitution function (or substitution table) based on the masked value. The substitution function may map or translate an input value to an output value where the output values for the input values may be based on the mask value. Subsequently, the hardware substitution box may receive the masked input value and may translate or map the masked input value to the output value by using the substitution function that was previously generated by using the masked value. As a result, the operations of the masked substitution box independently operate on the mask value (e.g., at a first time to generate the substitution function) and the masked input value (e.g., at a second time after the substitution function has been generated). Further details with regards to such an implementation of a masked substitution box are described in conjunction with FIGS. 1-3.

FIG. 1 illustrates an example architecture 100 to implement a masked substitution box. In general, the architecture 100 may be implemented in an integrated circuit such as a system on a chip (SoC), field-programmable gate array (FPGA), or other such device. The architecture 100 may be used to generate an output value based on a combination of a masked input value, an input mask value, and an output mask value.

The architecture 100 may be a substitution box that receives a six-bit input and provides a four-bit output or any other type of substitution box. The substitution box may be used with the Data Encryption Standard (DES) or Triple Data Encryption Standard (TDES) cryptographic operations. As such, a six-bit input may be mapped or translated to a four-bit output that is used in the DES cryptographic operation. The mapping of the six-bit inputs to four-bit outputs may result in a substitution table (e.g., a matrix) with repeated entries as outputs for certain inputs. Such a mapping where certain entries in the substitution table are not unique relative to other entries in the substitution table may result in a susceptibility to a side-channel attack. The architecture 100 may reduce the susceptibility of an integrated circuit to a side-channel attack by using an architecture to program a substitution table based on the mask value and then subsequently generate an output value based on a masked input value so that the mask value and the masked input value are not concurrently operated on by the substitution box. Such a separation between the mask value and the masked input value may reduce the susceptibility of the substitution box to a side-channel attack.

As shown in FIG. 1, the architecture 100 may include a first portion that is associated with generating a substitution function (e.g., values for entries of a substitution function or table) and a second portion that is associated with providing an output from the generated substitution function based on an input. The first portion may generate values for entries of a substitution function that is used to map various input values to various output values. For example, the first portion may generate the values for the entries of the substitution function based on a particular mask value. In some embodiments, the values for the entries of the substitution function may be generated for each mask value that is received.

The first portion may include a random counter 111, exclusive-or (XOR) components 112 and 114, substitution box 113, and a binary decoder 115. The random counter 111 may generate a random series of values between an initial value and a final value. For example, the random counter 111 may generate each value between and including a first value and the final value at varying or random sequences. For example, the values generated by the random counter 111 may not be in incrementing or decrementing order (e.g., a first value may be generated first followed by a second value that is higher than the first value and then a third value that is lower than the second value may be generated). Thus, the random counter 111 may output each value for an entry of a substitution function in a random order. For example, for a 6-input substitution function, the random counter 111 may generate each six-bit value. The random counter 111 may be coupled with an XOR component 112. For example, the outputs of the random counter 111 may then each be combined with an input mask 131 by the XOR component 112. The output of the random counter may be considered a masked input data. In some embodiments, the number of bits of the input mask (e.g., six bits) may be equal to the number of bits of the output of the random counter 111. The use of the random counter 111 may reduce the susceptibility of an integrated circuit to a side-channel attack during the programming or generating of the substitution table.

The XOR component 112 may be coupled to a substitution function 113. For example, the output of the XOR component 112 may be provided to the substitution function 113. In some embodiments, the substitution function 113 may input values to output values (e.g., a function that replaces an input value with a corresponding output value). For example, the substitution function 113 may be a predefined substitution box. Thus, the combination of the output of the random counter 111 and the input mask 131 may be mapped to a particular output value that is defined by the substitution function 113 that provides the mapped output value. In some embodiments, the substitution function 113 may be selected from multiple substitution functions. For example, a different substitution function 113 may be selected for a particular stage of a cryptographic operation that is to be performed. In some embodiments, the cryptographic operation may be a DES cryptographic operation that uses eight different substitution functions, and a different substitution function 113 may be selected to be used for each of the different stages of the DES cryptographic operation. For example, at a first time, a first substitution function may be used to provide the values of the entries of a masked substitution box and at a second time a second substitution function may be used to provide the values of the entries of the masked substitution box. Thus, the architecture may include multiple substitution function 113 that may each be separately used for different cryptographic operations.

Furthermore, the substitution function 113 may be coupled with another XOR component 114. For example, the output value of the substitution function 113 may be combined with the output mask value 132 by the XOR component 114 to generate a masked output value 133. Thus, each input value for each entry of the substitution function 113 may be provided by the random counter 111, combined with the input mask, and the result may then be mapped from an input value of the substitution function 113 to an output value of the substitution function 113 that is combined with an output mask value to generate another output value for an entry of a masked substitution box.

The masked output value 133 of the substitution function 113 may then be stored at a memory element 121 of the second portion of the architecture 100. For example, the masked output value 133 may be stored at a flip-flop or register of the second portion. The masked output value 133 may be stored at a latch, static random access memory (SRAM), or any other memory component or device. In some embodiments, an output of the binary decoder 115 may be used to store the masked output value 133 at a particular memory element 121 of multiple memory elements of the second portion. For example, the output of the binary decoder 115 may be used to enable one of the memory elements 121 of the second portion of the architecture 100 while not enabling the rest of the memory elements. Thus, the output of the binary decoder 115 may allow a masked output value 133 to be stored at one of the memory elements 121. The second portion may further include a multiplexer 122 that receives a selection signal 134 that is used by the multiplexer 122 to select a masked output value stored at one of the memory elements 121 as the masked output 135. For example, the binary decoder 115 may receive the masked input data corresponding to the random values from the random counter 111 and may use the received random value to enable one of the memory elements 121 to store the resulting masked output value 133 that is generated for the received random value. Similarly, for each subsequent random value, the binary decoder 115 may receive the subsequent random value and may use the subsequent random value to enable another one of the memory elements 121 to store another resulting masked output value that is generated for the subsequent random value. The multiplexer 122 may subsequently receive the selection signal 134 that corresponds to the random value to enable the corresponding memory element 121 that stores the masked output value 133 that was previously generated by using the random value from the random counter 111. Thus, the value of the selection signal 134 may be considered the input of a masked substitution box and the output from the multiplexer 133 that is stored at the selected memory element 121 may be considered the mapped output of the masked substitution box.

In operation, the first portion of the architecture 100 may program the values for entries of a substitution box into the memory elements of the second portion of the architecture 100. For example, the random counter 111 may provide each value for an entry of the substitution box and a resulting output for each entry of the substitution table may be generated. The output for each input entry may be stored at one of the memory elements of the second portion that is selected based on the random value generated by the random counter 111. Further details with regards to the operations of the architecture 100 are described in conjunction with FIG. 3.

Figure 2:
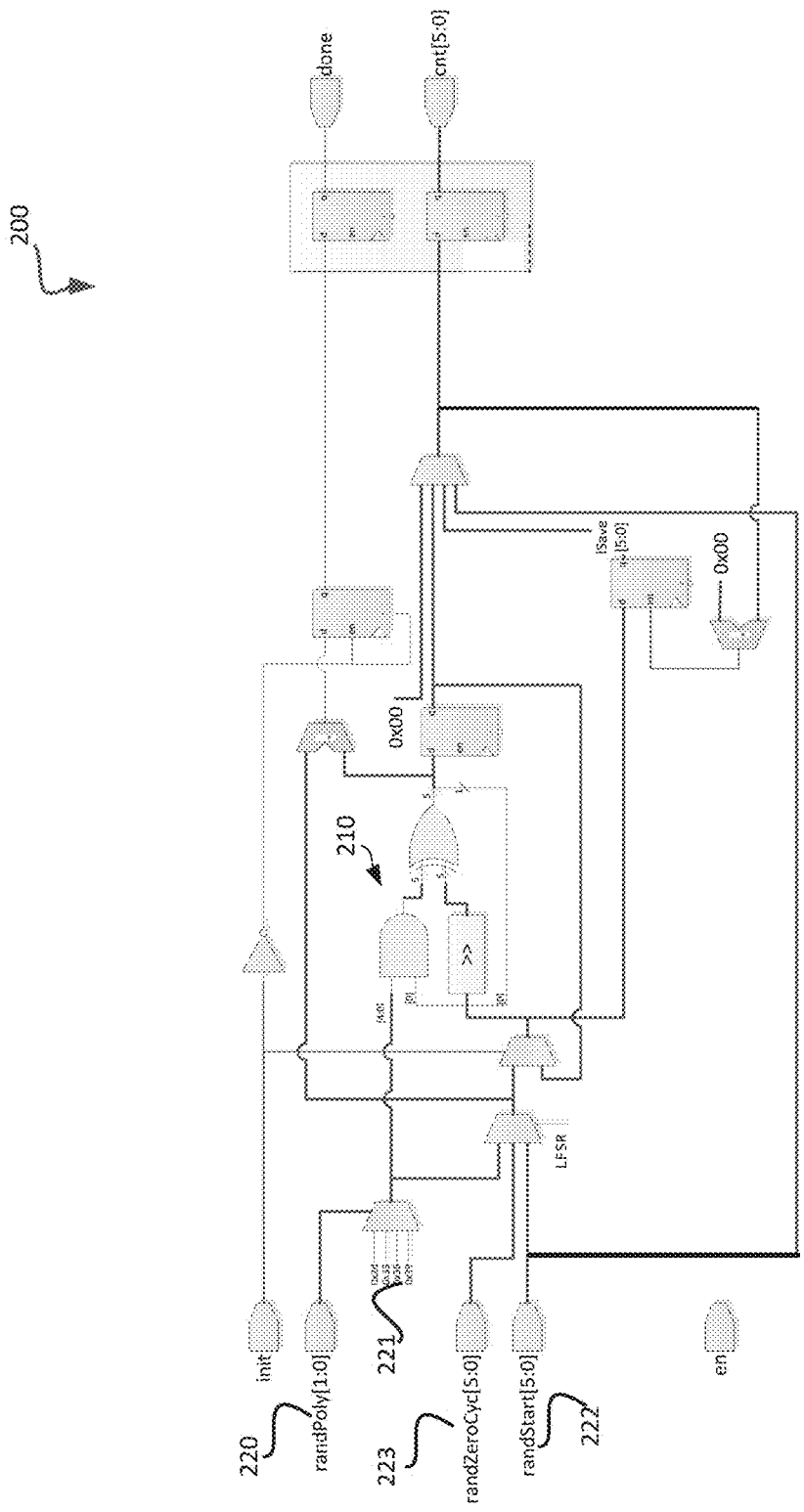
FIG. 2 is an example architecture of a counter used in a masked substitution box in accordance with some embodiments of the present disclosure.

FIG. 2 is an example architecture 200 of a random counter used in a masked substitution box. In general, the architecture 200 may correspond to the random counter 111 of a masked substitution box as described in conjunction with FIG. 1. The architecture 200 may be used to generate a random sequence of values to reduce susceptibility of a masked substitution box to a side channel attack.

As shown in FIG. 2, the architecture 200 of the random counter may include a Linear Feedback Shift Register (LFSR) 210. For example, the LFSR 210 may be a Galois LFSR that provides a pseudorandom sequence of values. In some embodiments, the LFSR 210 may be a Fibonacci LFSR or any other type of LFSR. The architecture 200 may receive a polynomial selection signal 220 that may correspond to a random value that is used to select one of the polynomial values 221. For example, a multiplexer may receive multiple polynomial values 221 and the polynomial selection signal 220 may correspond to a selection signal of the multiplexer that is used to select one of the multiple polynomial values 221 based on a value of the polynomial selection signal 220. The polynomial value may be a maximal length LFSR polynomial.

In some embodiments, the Galois LFSR 210 may not generate a value of zero (e.g., the Galois LFSR 210 may result in a locked status). Instead, a zero value may be inserted into the sequence of random values at a random point in the sequence. The insertion of the zero at a random point may contribute towards the reducing of the susceptibility of an integrated circuit to a side-channel attack where the zero value may be more easily observed in the sequence. In some embodiments, the Galois LFSR 210 may continue operating during the insertion of the zero value into the sequence to additionally contribute to reduce susceptibility to a side-channel attack. The random start signal 222 may correspond to a value that is used to choose the initial state of the random counter (e.g., the first random value that is output). The random zero signal 223 may be used to determine the position in the sequence where the zero value may be inserted.

As such, the random counter may generate a sequence of random values based on a selection of one of multiple polynomial values and the insertion of a zero value into the sequence of random values based on a signal used to determine the position of the zero value in the sequence of random values. In some embodiments, the random counter may further generate the sequence of random values based on another signal (e.g., another random value) that may be used to determine where in the sequence of random values to begin generating the random values of a particular sequence of random values that corresponds to one of the polynomial values 221.

Figure 3:
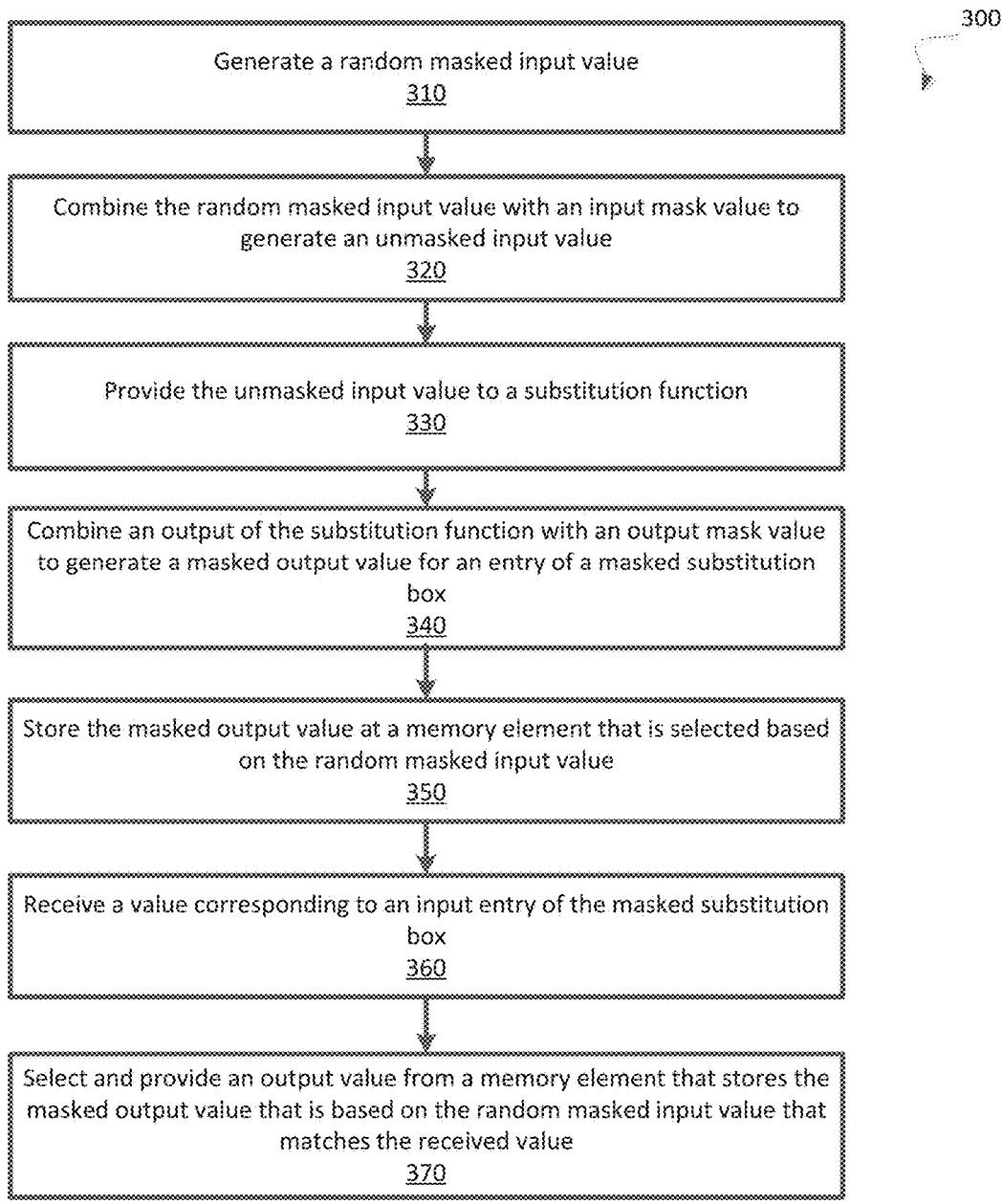
FIG. 3 is a flow diagram of an example method to program and use a masked substitution box in accordance with some embodiments.

FIG. 3 is a flow diagram of an example method 300 to program and use a masked substitution box. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. The method 300 may be performed by the architecture 100 of a masked substitution box as described in conjunction with FIG. 1.

As shown in FIG. 3, the method 300 may begin with the processing logic generating a random masked input value (block 310). For example, a random counter may generate a six-bit value. The processing logic may further combine the random masked input value with an input mask value to generate an unmasked input value (block 320). For example, an XOR operation may be performed with the random masked input value and the input mask value to generate the unmasked input value. The processing logic may subsequently provide the unmasked input value to a substitution function (block 330). In some embodiments, the substitution function may be a substitution box. The substitution function may replace the unmasked input value with another value. The processing logic may subsequently combine an output of the substitution function with an output mask value to generate an output value for an entry of a masked substitution box (block 340). The masked output value may then be stored at a memory element that is selected based on the random masked input value (block 350). For example, a masked output value based on the output of the substitution function may be stored at a memory element that is identified by the random masked input value that was used to generate the corresponding input to the substitution function when the masked output value was generated. Subsequently, the processing logic may receive a value corresponding to an input entry of the masked substitution box (block 360). For example, a selection signal of a multiplexer may be received. The processing logic may subsequently select and provide an output value from a memory element that stores the output value that is based on the random masked input value that matches the received value (block 370). For example, one memory element out of multiple memory elements may be selected and the masked output value stored at the selected memory element may be output by the multiplexer as a masked output value for the substitution box.

As such, a random counter may provide a sequence of random masked input values to be used as an input for a substitution function that provides corresponding outputs for each of the random masked input values. The corresponding outputs may each then be used to store a subsequent masked output value for a substitution box in a memory element. Furthermore, the corresponding memory elements that are used to store each of the subsequent masked output values for each of the random masked input values of the sequence may each be separately selected by using the random masked input value that was used to generate the corresponding masked output value by the substitution function. Thus, masked output values of the substitution box may be stored in memory elements. Each of the memory elements may store one of the masked output values. A particular masked output value stored at a particular memory element that was selected by the random masked input value may be provided when the random masked input value matches a subsequently received input value (e.g., the particular memory element was enabled by the random masked input value to store the corresponding masked output value when it was generated). Thus, the random masked input value that was used to select each of the memory elements when storing the respective output values may be considered the input for an entry of the masked substitution box.

Aspects of the present disclosure may further relate to another architecture of a substitution box based on a multiplexer lookup table. For example, the architecture may include multiplexers and memory elements (e.g., registers) where the input shares (e.g., the masked input data and the mask value) are independent so that the susceptibility of an integrated circuit that includes the substitution box to a side channel attack is reduced as the combining of the input shares does not occur within the architecture of the substitution box. The architecture may include multiplexers with selection signals corresponding to the input shares and the input data to the multiplexers being hard-coded values of a substitution function. The output of the architecture may be a masked output value of a masked substitution box. Furthermore, the architecture may be designed so that a design tool (e.g., a synthesis tool or other such integrated circuit design tool) may not remove portions of the architecture and thereby increase susceptibility to a side channel attack.

Figure 4:
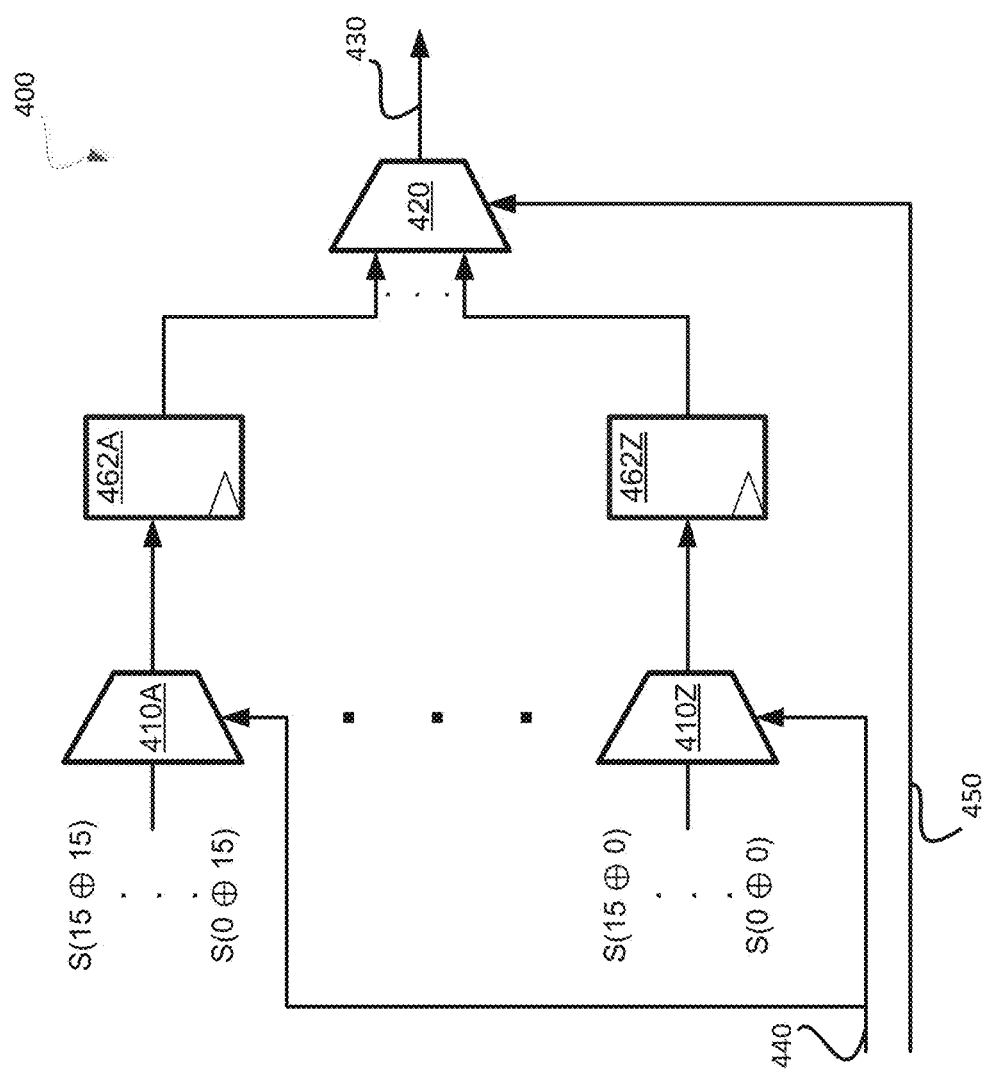
FIG. 4 illustrates an example architecture of a masked substitution box in accordance with some embodiments of the present disclosure.

FIG. 4 illustrates an example architecture 400 of a masked substitution box. In general, the architecture 400 may be implemented in an integrated circuit such as a system on a chip (SoC) or other such device. The architecture 400 may be used to generate a masked output value based on a combination of a masked input value and a mask value.

As shown in FIG. 4, the architecture 400 may be a substitution box that receives a four-bit input and provides a four-bit output. For example, the masked input value 440 may be four bits in size and the masked output value 430 may also be four bits in size. The substitution box may be implemented as a lookup-table (LUT) that is based on multiplexers 410A to 410Z. Each of the multiplexers 410A to 410Z may receive or be coupled to sixteen different values that correspond to output values of a substitution function that are based on a particular mask value. For example, a first multiplexer may include sixteen inputs where each input corresponds to an output value combined (e.g., based on an XOR operation) with the same first mask value. As shown in FIG. 4, the multiplexer 410A may receive sixteen hardwired values that corresponds to an increment value (e.g., from 0 to 15) that is combined with a mask value (e.g., 15) based on an XOR operation. A second multiplexer may include sixteen inputs where each input corresponds to the same output value combined with a different second mask value. For example, as shown, the multiplexer 410Z may receive sixteen other hardwired values that correspond to the incremented value (e.g., 0 to 15) that is combined with another mask value (e.g., 0) by using the XOR operation. Thus, for the four-bit input and four-bit output substitution box, the multiplexers 410A to 410Z may be coupled to or receive inputs corresponding to 256 different values corresponding to entries of a substitution function.

In some embodiments, the inputs of each of the multiplexers 410A to 410Z may be hard-wired or specified by the integrated circuit that includes the substitution box. Furthermore, the inputs may be associated with a constraint so that a synthesis tool or other such process may not remove portions of the architecture 400 of the substitution box during an optimization process that removes redundant portions of a design.

Referring to FIG. 4, the architecture 400 may further include a multiplexer 420 with inputs from each of the multiplexers 410A to 410Z. For example, the multiplexer 420 may receive sixteen input signals where each of the input signals corresponds to one of the outputs of the multiplexers 410A to 410Z. Furthermore, the architecture 400 may include a masked input data 440 and a mask value 450. The masked input data 440 may be received by each of the multiplexers 410A to 410Z and the mask value 450 may be received by the multiplexer 420. For example, the masked input data 440 may be a selection signal for each of the multiplexers 410A to 410Z to select one of the corresponding inputs to the multiplexers and the mask value 450 may be a selection signal for the multiplexer 420 to select an output of one of the multiplexers 410A to 410Z. As a result, the selection signals for the multiplexers of the architecture 400 may be the two input shares (e.g., the masked input data and the mask value) that are to be mapped to a corresponding output value 430. The input shares may thus be used or processed by a different portion of the architecture 400 of the substitution box, thereby reducing susceptibility of an integrated circuit including the architecture 400 to a side channel attack. For example, the masked input value may be used by the multiplexers 410A to 410Z while the mask value may be used by the multiplexer 420.

Furthermore, the architecture 400 may include registers 462A to 462Z. Furthermore, although not shown, the architecture 400 may include additional registers in the data paths of the selection signals for the multiplexers 410A to 410Z and the multiplexer 420 (e.g., registers or other such memory elements in the data paths for the masked input data to each multiplexer and the masked value). The register in the masked input data signal path may receive and output the masked input data 440, the register in the mask value signal path may receive and output the mask data 450, and the registers 462A to 462Z may be in the data paths between the multiplexers 410A to 410Z and the multiplexer 420. The registers may reduce the susceptibility to the side channel attack by separating or splitting the operation of the input shares within the architecture 400. Furthermore, the input shares may be updated at different clock cycles to decrease susceptibility to a side channel attack. For example, the use of the registers may reduce glitches from propagating through the circuit and reduce the likelihood of a value that is based on the masked input data being combined with another value that is based on the mask value.

Figure 5:
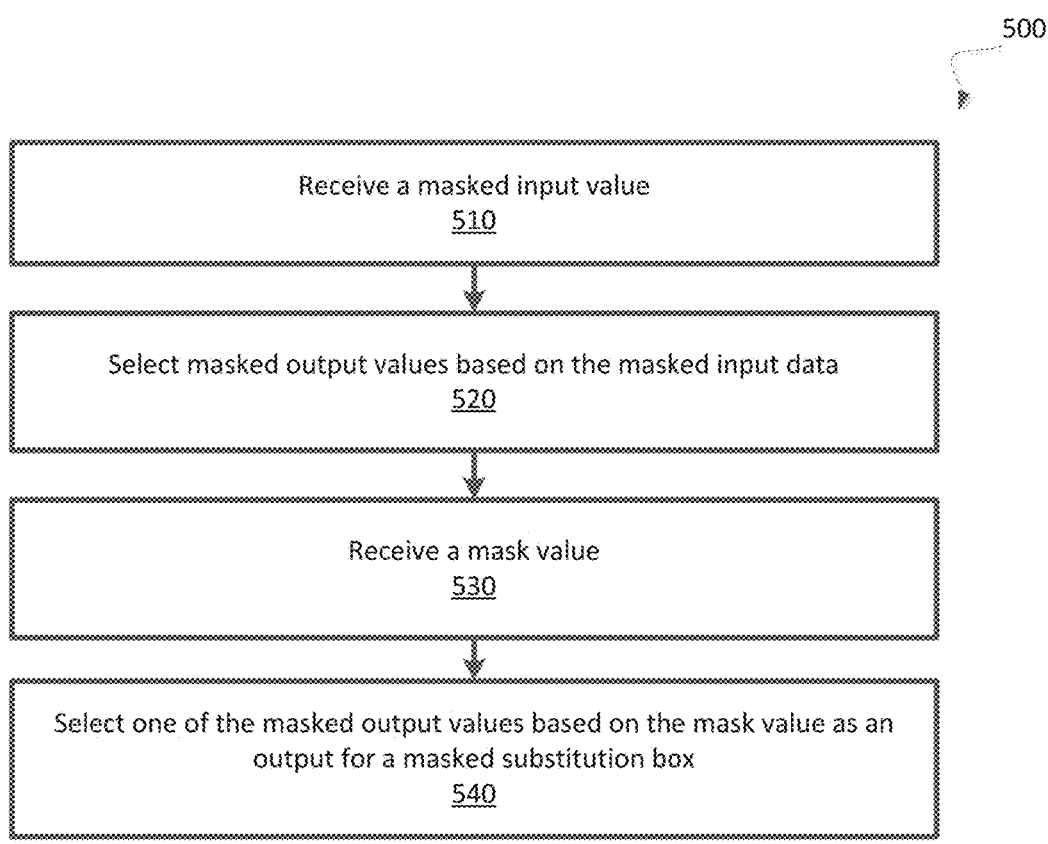
FIG. 5 illustrates a flow diagram of an example method to use the masked substitution box in accordance with some embodiments of the present disclosure.

FIG. 5 illustrates a flow diagram of an example method 500 to use the masked substitution box. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. The method 500 may be performed by the architecture 400 of a masked substitution box as described in conjunction with FIG. 4.

As shown in FIG. 5, the method 500 may begin with the processing logic receiving a masked input data (block 510) and selecting masked output values based on the masked input data (block 520). For example, the masked input data may be received as a selection signal for a first group of multiplexers. Each multiplexer from the first group of multiplexers may select an input signal to be output. In some embodiments, a value from each multiplexer of the first group may correspond to an output value of a substitution function that has been combined with a particular value. For example, a first multiplexer may output a value corresponding to the output value combined with a first mask value and a second multiplexer may output another value corresponding to the output value combined with a second mask value. Thus, each multiplexer of the first group may provide an output that corresponds with the output value combined with a different mask value.

The processing logic may also receive a mask value (block 530) and select one of the masked output values based on the mask value as an output for a masked substitution box (block 540). For example, another multiplexer may receive the various values from each multiplexer of the first group and may select one of the various values to be provided as a masked output of the substitution box by using the value of the mask value.

As such, a first input share (e.g., the masked input data) may be used to provide outputs from a group of multiplexers. The second input share (e.g., the mask value) may be used to select one of the outputs from the group of multiplexers to be used as an output of a substitution box. The output may be a corresponding value that is mapped to the combination of the first input share and the second input share (e.g., an input value). In some embodiments, the input shares (e.g., the masked input data and the mask value) may be provided to the architecture at different times or clock cycles, and may be associated with a pre-charge cycle.

Aspects of the present disclosure may further relate to another architecture of a masked substitution box based on a multiplexer lookup table. For example, the architecture may provide a masked substitution box by using parallel substitution functions and a one-hot multiplexer structure. The architecture that is based on parallel substitution functions and the one-hot multiplexer structure may provide resistance to a side channel attack by reducing portions of an integrated circuit where input shares may be combined. For example, a first input share (e.g., a masked input data) may be received by a first portion of the integrated circuit and a second input share (e.g., a mask value) may be received by a second portion of the integrated circuit. The one-hot multiplexer structure may then be used to combine a value based on the first input share and another value based on the second input share. Thus, since the combining of the values is limited to the one-hot multiplexer structure, an analysis of the power consumption of the integrated circuit by an attacker may result in less information that may be used to retrieve or reconstruct secret information when observing power consumption as the substitution box is being used.

Figure 6:
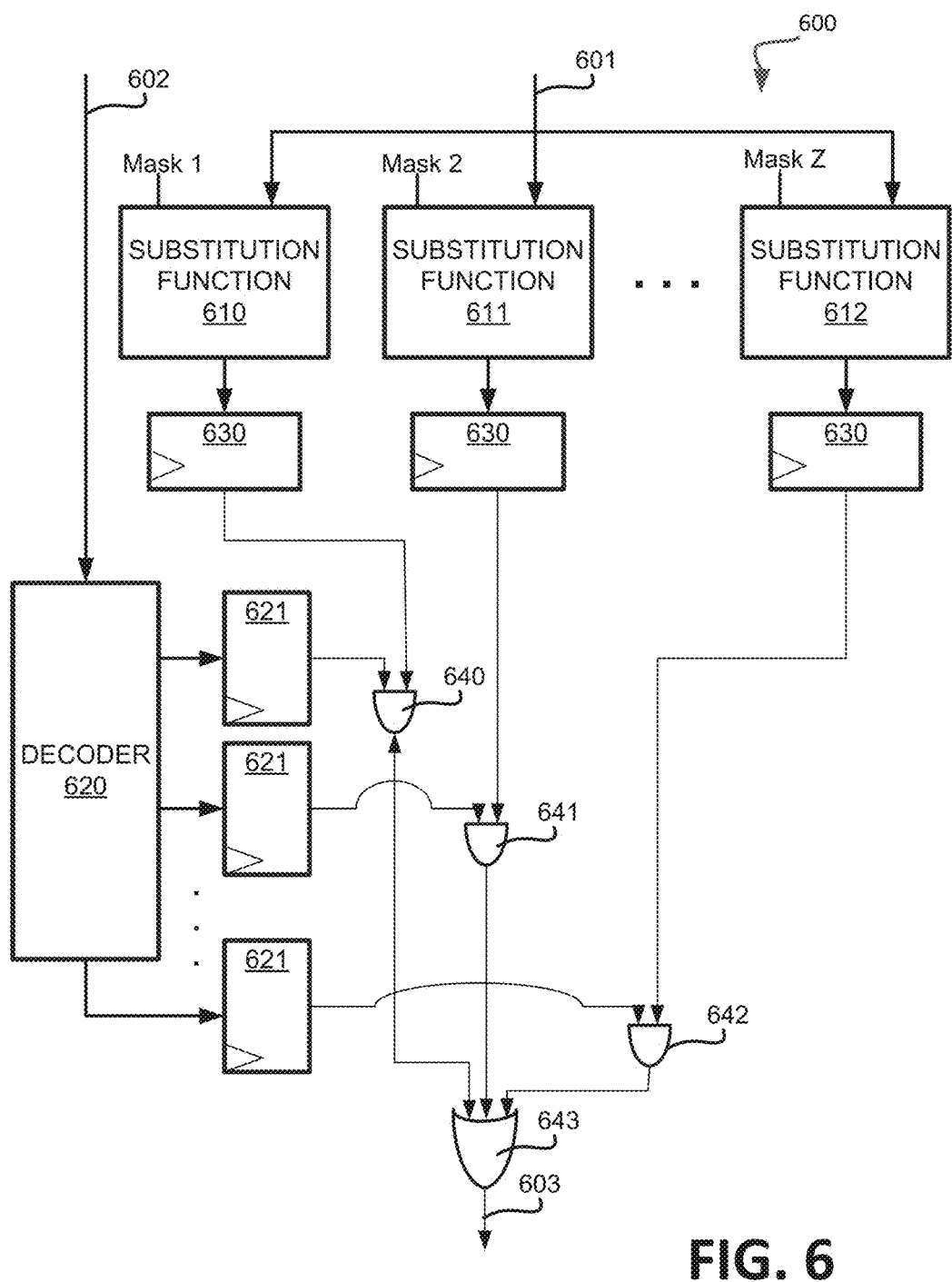
FIG. 6 illustrates another example architecture of a masked substitution box in accordance with some embodiments of the present disclosure.

FIG. 6 illustrates another example architecture 600 of a masked substitution box that is based on parallel substitution functions and a one-hot multiplexer. In general, the architecture 600 may be implemented in an integrated circuit such as a system on a chip (SoC) or other such device. The architecture 600 may be used to generate a masked output value based on a combination of a masked input value and a mask value.

As shown in FIG. 6, the architecture 600 may include a first portion that generates multiple masked output values based on an input value 601. For example, the masked output values may be used to generate values that represent a combination of the input value 601 and each of the mask values that are used in association (e.g., that are available) with the input value 601. For example, the first portion of the integrated circuit may include a first substitution function 610 that receives the input data 601 and a first mask value to generate a first masked output value. A second substitution function 611 may receive the same input data 601 and a second mask value and may generate a second masked output value. A third substitution function 612 may also receive the same input data 601 and a third mask value to generate a third masked output value. The number of substitution function that receive the input value 601 and a different mask value may correspond to the number of mask values that are used. The masked output values from each of the substitution function may be stored in registers 630 or other such memory elements. As such, the first portion of the architecture 600 may operate on one of two input shares without operating on the other input share. The first portion of the architecture 600 may include multiple parallel substitution functions that each evaluate or operate on the input data 601 under all of the possible mask values that are used.

In some embodiments, each of the substitution functions 610, 611, and 612 may correspond to a 4:4 substitution function that receives four-bit inputs (e.g., the input data 601) and may output a four-bit output mask value. Furthermore, the mask value for each of the substitution functions 610, 611, and 612 may also be a four-bit value. The substitution functions may perform an XOR operation between the received input data 601 and the corresponding mask value and may substitute or replace the combination of the received input data 601 and the corresponding mask value with a masked output value that is defined by the respective substitution function.

Referring to FIG. 6, a second portion of the architecture 600 may receive and operate on the other of the two input shares. For example, as shown, the second portion of the architecture 600 may receive a mask value 602. For example, a decoder 620 may receive the mask value 602 and may provide decoded outputs that are stored at registers 621. In some embodiments, the decoder 620 may be a 4:16 decoder that receives a four-bit input (e.g., the mask value 602) and provides a sixteen-bit output where each bit is stored in one of the registers 621. The decoder 620 may be a one-hot decoder where one of the sixteen bits of the decoded output is at a first value (e.g., a value of '1') and the other values are at a second value (e.g., a value of '0'). As such, the decoder 620 may receive the mask value 602 and may provide a decoded output value that includes one bit that is of a different value than all of the other bits of the decoded output value.

Logic components 640, 641, 642, and 643 (e.g., Boolean OR gates and Boolean AND gates) may be used to implement a multiplexer where the masked output values from the substitution functions 610, 611, and 612 that are stored at memory elements or registers 630 correspond to inputs of the multiplexer that are selected based on a selection signal that is represented by the decoded output values that are stored at the memory elements or registers 621. The output of the logical component 643 may correspond to a masked output value of an entry of a masked substitution box.

Thus, an input value and a mask value may be received. The input value may be combined with different mask values (e.g., via an XOR or an OR operation) to map the different combinations to different output values by using substitution boxes or other such substitution functions that are implemented in parallel. The mask value may be used to generate a decoded output value that is used to select one of the outputs of the substitution boxes. The resulting output may correspond to a masked output value for a new substitution box.

In some embodiments, the memory elements or registers 621 and 630 may further reduce the susceptibility of the architecture 600 to a side channel attack by reducing propagation of glitches through the architecture 600. Furthermore, the logic of the architecture 600 may be implemented based on a secure logic style to further reduce susceptibility to a side channel attack.

Figure 7:
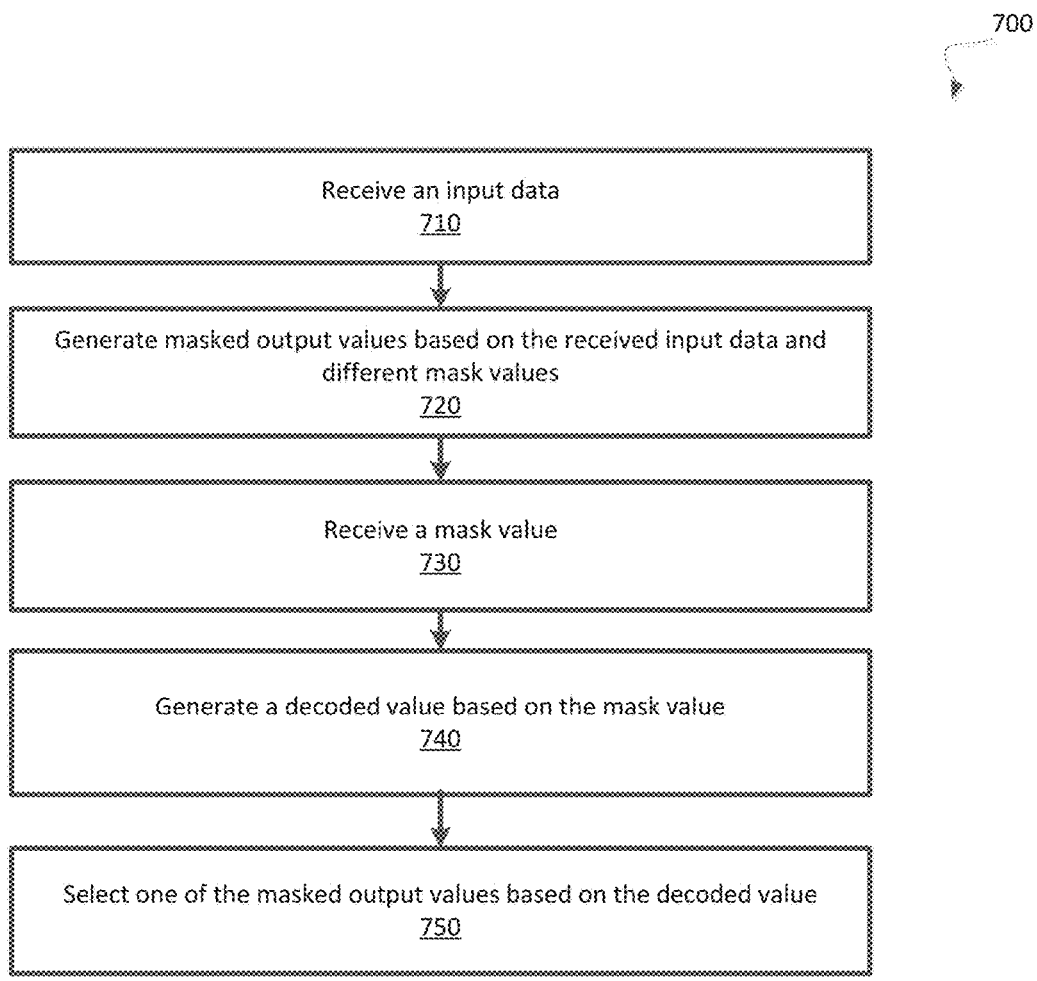
FIG. 7 illustrates a flow diagram of an example method to use a masked substitution box based on a one-hot multiplexer in accordance with some embodiments of the present disclosure.

FIG. 7 illustrates a flow diagram of an example method 700 to use a masked substitution box based on a one-hot multiplexer. In general, the method 700 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. The method 700 may be performed by the architecture 600 of a masked substitution box as described in conjunction with FIG. 6.

As shown in FIG. 7, the method 700 may begin with the processing logic receiving an input data (block 710). The input data may be received by multiple substitution functions. For example, multiple predefined or preset substitution functions may receive the input data. The processing logic may further generate multiple masked output values based on the received input data and different mask values (block 720). For example, each of the substitution functions that receives the input data may also receive a different mask value. Each of the substitution functions may thus generate a different masked output value based on a combination of the same input data and a different mask value. The number of masked output values that are generated may be based on a number of mask values that are available. The processing logic may further receive a mask value (block 730). For example, a one-hot decoder may receive the mask value. Subsequently, the processing logic may generate a decoded value based on the mask value (block 740). For example, the one-hot decoder may generate a decoded value where one bit is at a first value and the other bits of the decoded value are at a second value that is different than the first value. The processing logic may subsequently select one of the output values based on the decoded output value (block 750). The selected output value may be used as a masked output value for a masked substitution box.

Aspects of the present disclosure may further relate to another architecture to provide a masked Data Encryption Standard (DES) substitution box that is based on one-hot decoders. The masked substitution box may be also used in TDES. Such an architecture may receive a six-bit input and provide a six-bit output that may be used for a DES cryptographic operation. The architecture of the substitution box may include one-hot decoders to receive a masked input data and an input mask to unmask the masked input data and obtain the input data that is subsequently used in a substitution function to map the input data to a particular output data. Furthermore, an encoder may then be used to encode the output data with an output mask value. The architecture of the masked DES substitution box may reduce susceptibility to a side channel attack by reducing data dependence associated with the input data and the output data. For example, the use of the one-hot decoders may provide a symmetrical structure when combining the input shares, resulting in a reduced susceptibility to a side channel attack.

Figure 8:
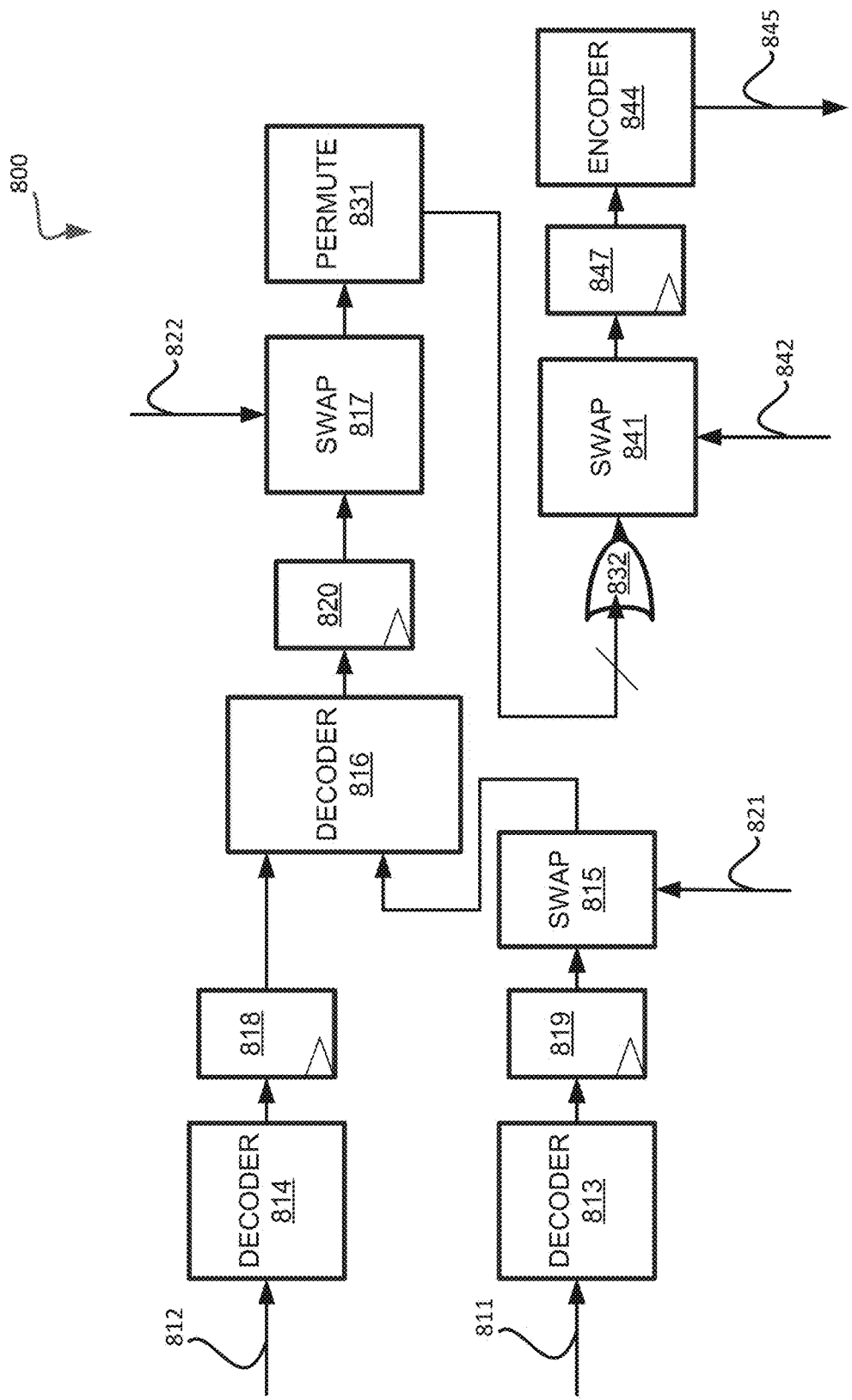
FIG. 8 illustrates another example architecture of a masked substitution box based on one-hot decoders in accordance with some embodiments of the present disclosure.

FIG. 8 illustrates another example architecture 800 of a masked substitution box that is based on one-hot decoders. In general, the architecture 800 may be implemented in an integrated circuit such as a system on a chip (SoC) or other such device. The architecture 800 may be used to generate a masked output value based on a combination of a masked input value and a mask value.

As shown in FIG. 8, the architecture 800 may include a first portion that is used to decode and unmask a masked input data, a second portion that is used to perform a substitution function with the input data, and a third portion that is used to mask the output value of the substitution function and to encode the masked output value. The first portion may include decoders (e.g., first and second decoders 814 and 813 and third decoder 816), memory elements (e.g., registers 818, 819, and 820), and swap components (e.g., swap components 815 and 817). The first portion may receive the masked input value of six bits where a first portion 812 of the masked input value is received by a first decoder 814 and a second portion 811 of the masked input value is received by a second decoder 813. In some embodiments, the first portion 812 of the masked input value may be the first four bits of the masked input value and the second portion 812 of the masked input value may be the last two bits of the masked input value. Thus, the masked input value may be six bits in size.

The first decoder 814 may be a 4:16 decoder that receives the four input bits of the first portion 812 of the masked input value and may provide a sixteen-bit output. In some embodiments, the sixteen bit output of the decoder 814 may correspond to a one-hot output as previously described (e.g., one of the bits is at a first value and the rest of the bits are at a different value). The second decoder 813 may be a 2:4 decoder that receives the two input bits of the second portion 811 of the masked input values and provides a four-bit output. In some embodiments, the four-bit output may correspond to a one-hot output. The output of the first decoder 814 may be stored at a first register 818 and the output of the second decoder 813 may be stored at a second register 819. In some embodiments, the output of the second decoder 813 may also be a one-hot output. In some embodiments, the first register 818 and the second register 819 may be used to reduce propagation of signals caused by glitches in the first portion of the architecture 800.

Referring to FIG. 8, the output of the second decoder 813, or the output of the register 819 that stores the output of the second decoder 813, may be coupled to a swap component 815 that may also receive a portion 821 of the input mask. The portion 821 of the input mask may correspond to the last two bits of an input mask value. In some embodiments, the swap component 815 may receive the output of the second decoder 813 (e.g., the four bit decoded one-hot value) and the portion 821 of the input mask value (e.g., the last two bits of the input mask value) and may swap bits between the output of the second decoder 813 and the portion 821 of the input mask value to generate a swapped value that is received by a third decoder 816. Thus, the swap component 815 may switch the positions of the values of the input to generate a corresponding output. Furthermore, the third decoder 816 may also receive the decoded output value from the decoder 814 that is stored at the register 818. In some embodiments, the third decoder 816 may be a 20:64 one-hot decoder that receives 20 bits corresponding to the decoded output value of the first decoder 814 and the four-bit swapped value from the swap component 815 and generates a 64-bit one-hot decoded output value. Furthermore, the output of the third decoder 816 may be stored in another register 820 and the output of the third decoder 816 may subsequently be received by the swap component 817 that also receives another portion 822 of the input mask value (e.g., the first four or four most significant bits of the input mask value). The output of the swap component 817 may be the unmasked input data corresponding to the masked input data that was received by the first portion of the architecture 800 (e.g., by the first and second decoders 814 and 813). As a result, the first portion of the architecture 800 may unmask the masked input data by using decoders and swap components so that the unmasked input data may be used by the second portion of the architecture 800.

As shown in FIG. 8, the second portion of the architecture 800 may receive the unmasked input data and may perform a substitution function. For example, the output of the swap component 817 may be received by a permutation component 831 of the second portion of the architecture 800. In some embodiments, the permutation component 831 may correspond to a swindling of wires corresponding to its input to generate an output value. For example, the permutation component 831 may receive the output of the swap component 817 and may generate a 64-bit output. In some embodiments, the permutation component 831 may be a substitution function that maps the input value to a corresponding output value based on a switching of wire connections between bits of the input value and bits of the corresponding output value. Thus, the permutation component 831 may be a substitution function that does not include an active component (e.g., logic gates) that performs the substitution of the input value with the output value by the switching or permutation of input wires of input connections to output wires of output connections of the permutation component 831. In some embodiments, the output of the permutation component 831 may correspond to 64-bits that are received by an OR logic component 832 that may reduce the 64-bits to a 16-bit output. Furthermore, the 16-bit output of the OR logic component 832 may correspond to an unmasked output value of the substitution box that is represented by the architecture 800.

As shown in FIG. 8, a third portion of the architecture 800 may apply a mask value to the output of the second portion and may further decode the output value. For example, the output of the second portion may be received by a swap component 841 that also receives an output mask value 842. The swap component 841 may generate an output value that is based on a combination of the output of the second portion from the OR logic component 832 and the output mask 842. The output value of the swap component 841 may be stored at another register 847 and the output value may subsequently be received by an encoder 844 that provides a masked output value 845. In some embodiments, the encoder 844 may be a 16:4 encoder that receives a sixteen bit input and generates a four-bit output that represents a masked output value for a substitution box.

Figure 9:
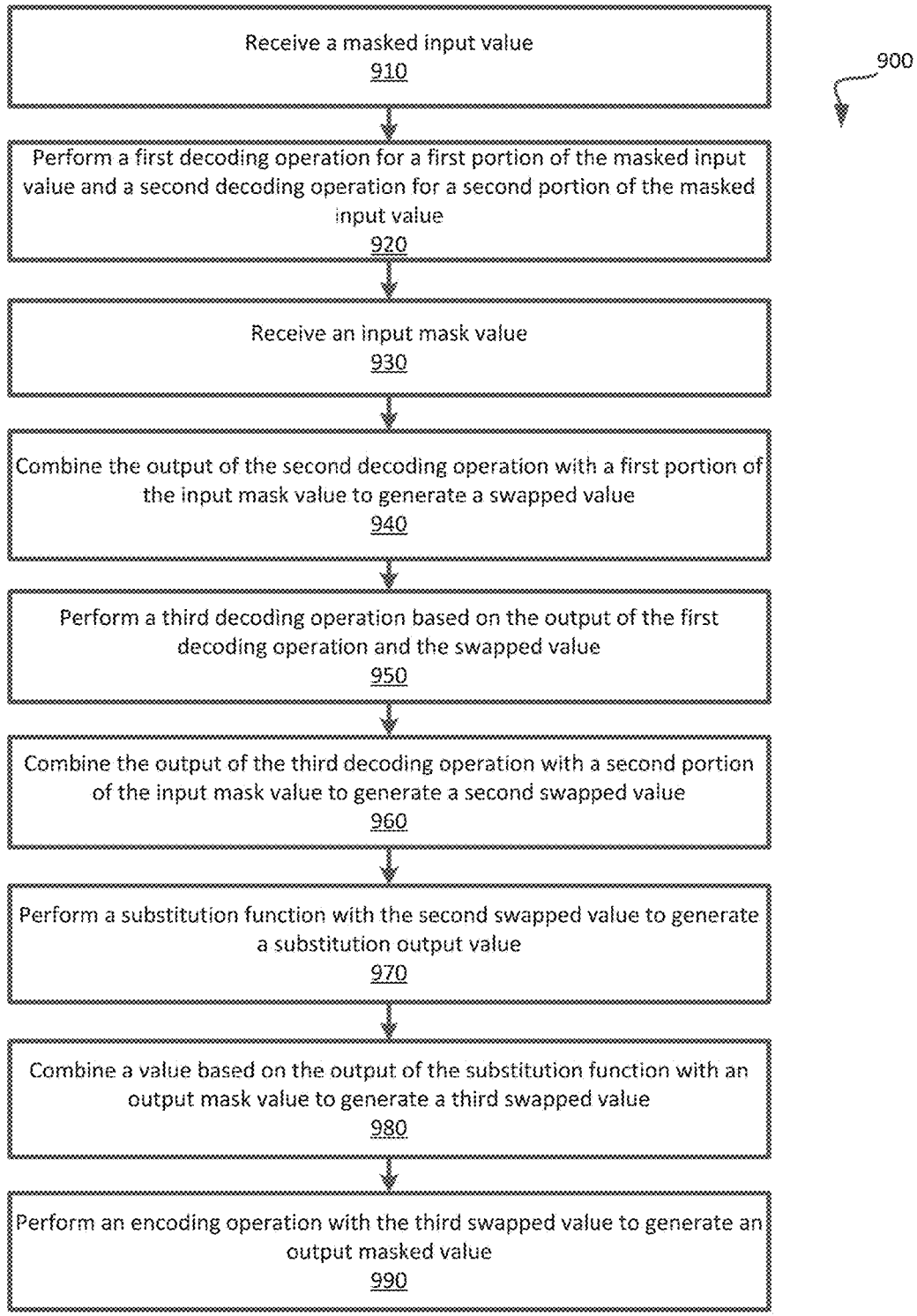
FIG. 9 illustrates a flow diagram of an example method to use the masked substitution box based on a one-hot multiplexer in accordance with some embodiments of the present disclosure.

FIG. 9 illustrates a flow diagram of an example method 900 to use the masked substitution box based on a one-hot multiplexer. In general, the method 900 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. The method 900 may be performed by the architecture 800 of a masked substitution box as described in conjunction with FIG. 8.

As shown in FIG. 9, the method 900 may begin with the processing logic receiving a masked input value (block 910). The processing logic may subsequently perform a first decoding operation for a first portion of the masked input value and a second decoding operation for a second portion of the masked input value (block 920). For example, a first decoder may operate on the most significant bits of the masked input value and a second decoder may operate on the least significant bits of the masked input value. The processing logic may further receive an input mask value (block 930). Furthermore, the processing logic may combine the output of the second decoding operation with a first portion of the input mask value to generate a swapped value (block 940). For example, the swap component may be used to generate an output value based on a combination of the output of the second decoding operation and a portion of the input mask value. The processing logic may further perform a third decoding operation based on the output of the first decoding operation and the swapped value (block 950). For example, a third decoder may receive an output of the first decoder and the swapped value that is based on the output of the second decoder and the portion of the input mask value. Furthermore, the processing logic may combine the output of the third decoding operation with a second portion of the input mask value to generate a second swapped value (block 960). For example, another swap component may be used to generate an output value based on a combination of the output of the third decoding operation and a different portion of the input mask value. The processing logic may subsequently perform a substitution function with the second swapped value to generate a substitution output value (block 970). The substitution output value may be the corresponding output value of the substitution function that is mapped to the input value corresponding to the second swapped value for the substitution function. In some embodiments, the substitution output value may be reduced to a lesser number of bits and may be a one-hot value. The processing logic may further combine a value based on the output of the substitution function with an output mask value to generate a third swapped value (block 980). For example, the reduced substitution output value may be combined with the output mask value by another swap component. Subsequently, the processing logic may perform an encoding operation with the third swapped value to generate an output masked value (block 990). For example, the reduced substitution output value may be encoded from the one-hot value to a four-bit masked output value that corresponds to the masked input value.

Figure 10:
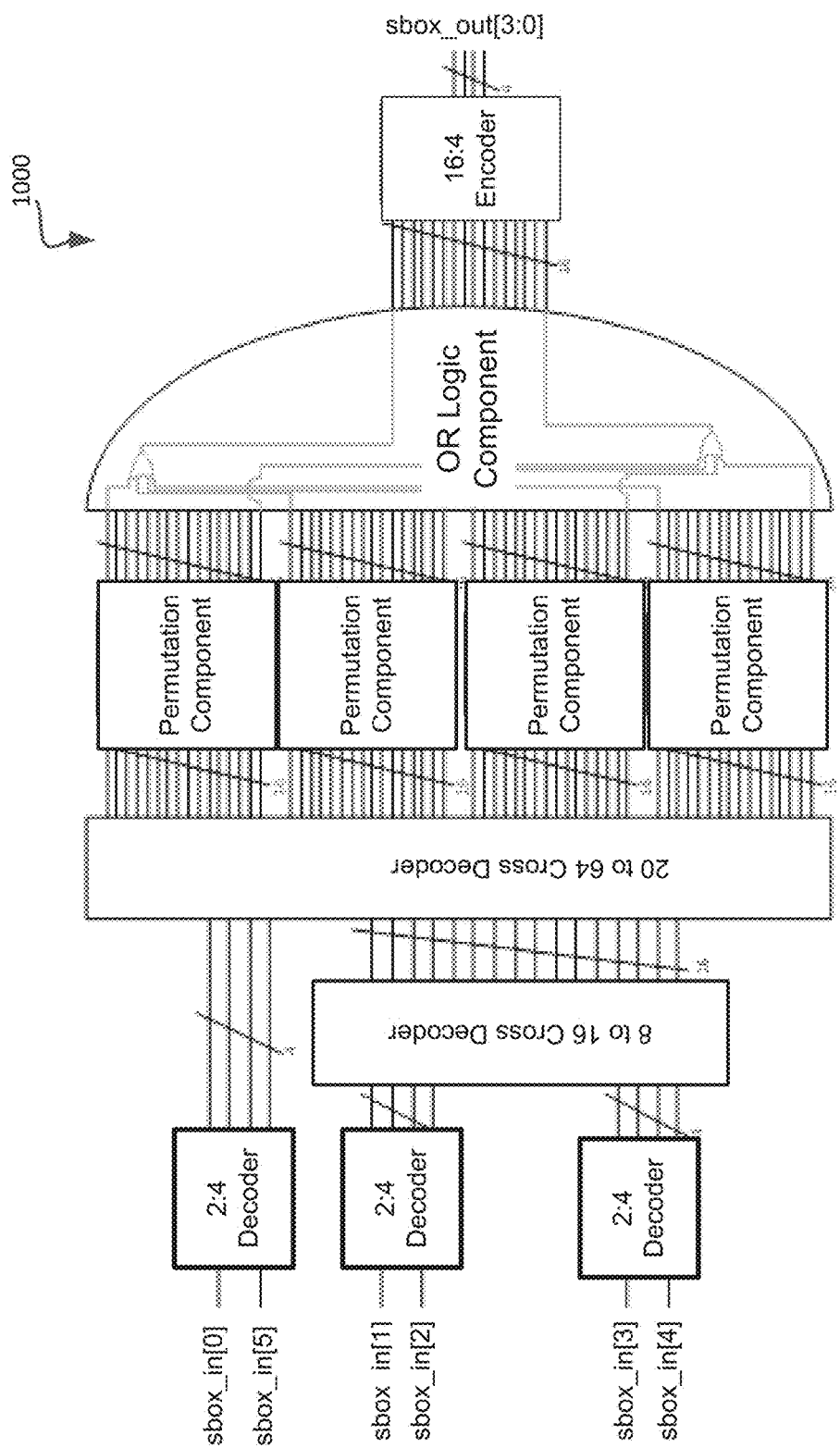
FIG. 10 illustrates an architecture of a substitution box in accordance with some embodiments of the present disclosure.

FIG. 10 illustrates an architecture 1000 of a substitution box. In general, the architecture 1000 may be implemented in an integrated circuit such as a system on a chip (SoC) or other such device. The architecture 1000 may be used to generate an output value based on an input value.

As shown in FIG. 10, the architecture 1000 may correspond to an unmasked substitution box. For example, an input data may be received by multiple decoders. A first portion of the input data may be received by a first decoder, a second portion of the input data may be received by a second decoder, and a third portion of the input data may be received by a third decoder. The outputs of the first decoder and the second decoder may be received by a fourth decoder. Furthermore, as shown, a fifth decoder may receive the output of the third decoder and the output of the fourth decoder to generate a decoded value that is coupled to multiple permutation components that each correspond to a substitution function. In some embodiments, the first and second portions of the input data (e.g., bits 1, 2, 3, and 4) may be used to calculate output substitution values with the four permutation components and the third portion of the input data (e.g., bits 0 and 5) may be used to select one of the output substitution values from the four permutation components. The OR logic component and the 16:4 encoder component may function as a multiplexer that selects one of the output substitution values based on the third portion of the input data and may encode the selected output substitution value to generate a resulting output value that is the substituted value for the earlier received input data.

Figure 11:
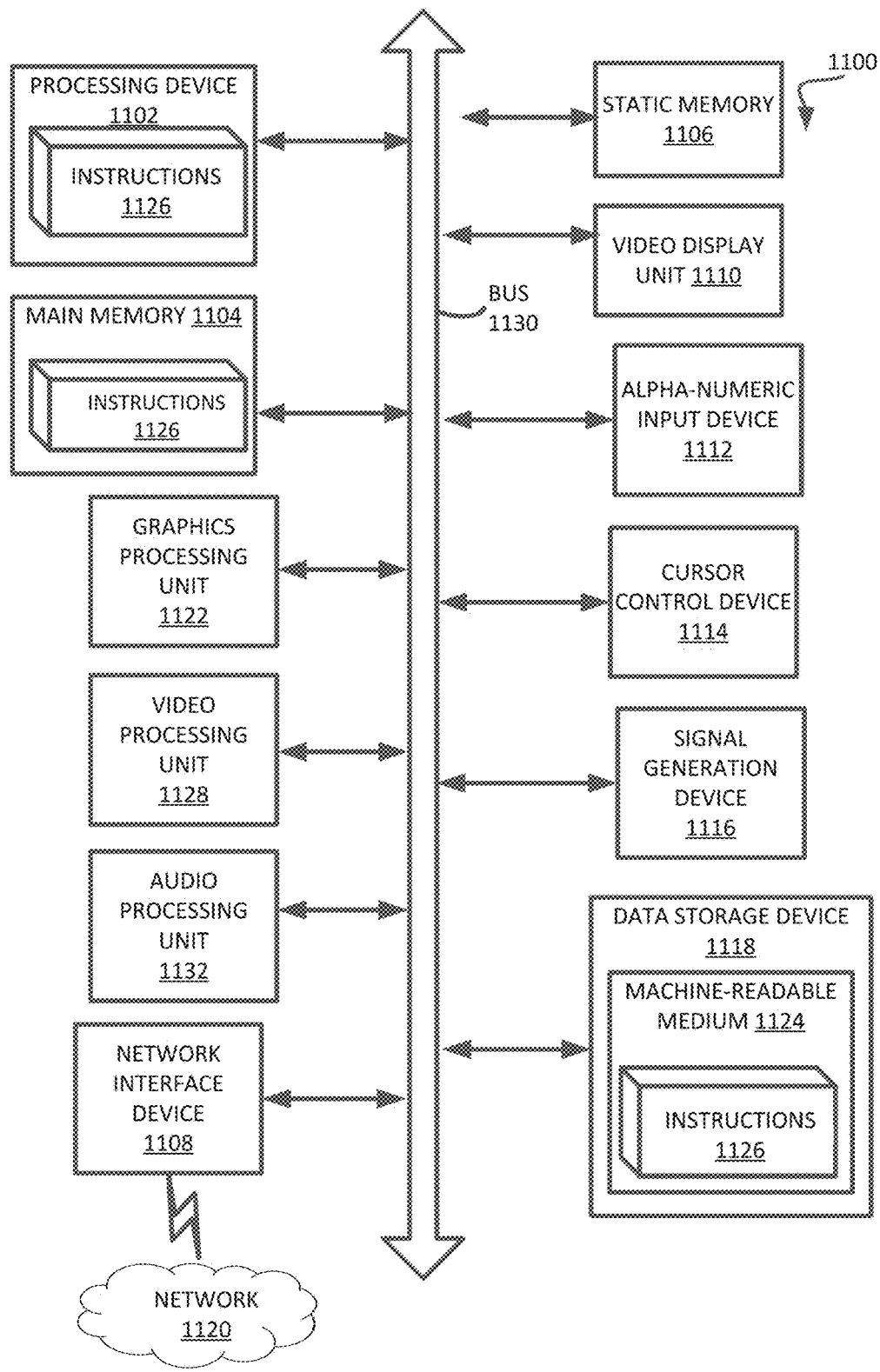
FIG. 11 illustrates a block diagram of an embodiment of a computer system in which some embodiments of the disclosure may operate.

FIG. 11 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 110 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a computer-readable medium) on which is stored one or more sets of instructions or software 1126 embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In one implementation, the instructions 1126 include instructions to implement functionality corresponding to the components of a masked substitution box as described in conjunction with FIGS. 1-10. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. An integrated circuit comprising:
   a counter to generate a plurality of counter values;
   an input mask component to generate a plurality of unmasked input values, wherein an unmasked input value of the plurality of unmasked input values is based on a combination of a respective counter value of the plurality of counter values and an input mask value;
   a substitution function component to receive the plurality of unmasked input values and to generate a plurality of output values, wherein an output value of the plurality of output values is based on a respective unmasked input value of the plurality of unmasked input values and a substitution function;
   an output mask component to generate a plurality of masked output values, wherein a masked output value of the plurality of masked output values is based on a combination of a respective output value of the plurality of output values and an output mask value; and
   a plurality of memory elements to store the plurality of masked output values.

2. The integrated circuit of claim 1, wherein the integrated circuit corresponds to a substitution box, wherein input values of the substitution box are based on the counter values and output values of the substitution box are based on the output values that are generated based on the substitution function.

3. The integrated circuit of claim 1, wherein the counter is a random counter that generates a sequence of random values in a random order.

4. The integrated circuit of claim 1, further comprising:
   a decoder to receive the counter values from the counter and to generate a plurality of decoded outputs, wherein a decoded output of the plurality of decoded outputs is used to enable one memory element of the plurality of memory elements to store a corresponding masked output value of the plurality of masked output values that has been generated by using a corresponding counter value of the plurality of counter values that was used to generate the corresponding masked output value.

5. The integrated circuit of claim 4, further comprising:
   a multiplexer coupled to the memory elements and to receive a selection signal and to select one of the masked output values stored at the memory elements as an output signal based on the selection signal matching a respective decoded output of the plurality of decoded outputs that was used to enable one of the memory elements.

* * * * *